(12) United States Patent     (10) Patent No.:    US 8,868,440 B1
Kotla et al.                                                (45) Date of Patent:      Oct. 21, 2014

(54) FORECASTING AND ANALYSIS TOOL

(75) Inventors: Nithin Reddy Kotla, New Milford, CT (US); Janne Elaine Williamson, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 2499 days.

(21) Appl. No.: 11/031,918

(22) Filed: Jan. 7, 2005

(51) Int. Cl.
    *G06Q 10/00*            (2012.01)
    *G06Q 10/06*            (2012.01)

(52) U.S. Cl.
    CPC ............................. *G06Q 10/06313* (2013.01)
    USPC ...................... 705/7.17; 705/7.13; 705/7.16

(58) Field of Classification Search
    USPC ...................................... 705/7.13, 7.16, 7.17
    See application file for complete search history.

(56) References Cited

U.S. PATENT DOCUMENTS

| | | | | |
|---|---|---|---|---|
| 5,189,606 | A * | 2/1993 | Burns et al. | 705/10 |
| 5,406,476 | A * | 4/1995 | Deziel et al. | 705/8 |
| 5,459,656 | A * | 10/1995 | Fields et al. | 705/7 |
| 5,467,268 | A * | 11/1995 | Sisley et al. | 705/9 |
| 5,548,506 | A * | 8/1996 | Srinivasan | 705/8 |
| 5,615,121 | A * | 3/1997 | Babayev et al. | 705/9 |
| 5,845,258 | A * | 12/1998 | Kennedy | 705/8 |
| 5,867,822 | A * | 2/1999 | Sankar | 705/8 |
| 5,907,490 | A * | 5/1999 | Oliver | 700/90 |
| 6,035,278 | A * | 3/2000 | Mansour | 705/9 |
| 6,978,249 | B1 * | 12/2005 | Beyer et al. | 705/10 |
| 7,343,312 | B2 * | 3/2008 | Capek et al. | 705/8 |
| 7,467,161 | B2 * | 12/2008 | Frisina | 707/104.1 |
| 7,483,841 | B1 * | 1/2009 | Jin et al. | 705/7 |
| 7,562,338 | B2 * | 7/2009 | Knutson et al. | 717/101 |
| 2002/0082889 | A1 * | 6/2002 | Oliver | 705/8 |
| 2002/0198926 | A1 * | 12/2002 | Panter et al. | 709/106 |
| 2003/0033184 | A1 * | 2/2003 | Benbassat et al. | 705/8 |
| 2003/0135401 | A1 * | 7/2003 | Parr | 705/8 |
| 2003/0233267 | A1 * | 12/2003 | Hertel-Szabadi | 705/9 |
| 2004/0107133 | A1 * | 6/2004 | Pantaleo et al. | 705/11 |
| 2004/0162753 | A1 * | 8/2004 | Vogel et al. | 705/10 |
| 2004/0255296 | A1 * | 12/2004 | Schmidt et al. | 718/100 |
| 2005/0119911 | A1 * | 6/2005 | Ayan et al. | 705/1 |
| 2005/0125259 | A1 * | 6/2005 | Annappindi | 705/4 |
| 2006/0010418 | A1 * | 1/2006 | Gupta et al. | 717/101 |
| 2006/0190391 | A1 * | 8/2006 | Cullen et al. | 705/37 |

OTHER PUBLICATIONS

Giannotti Bertazzoni, RASP Resource Allocator for Software Projects, 1990, ACM, (3rd international conference on Industrial and engineering applications of artificial intelligence and expert systems—vol. 2), p. 628-637.*

* cited by examiner

*Primary Examiner* — Beth V Boswell
*Assistant Examiner* — Stephen S Swartz

(57) ABSTRACT

A software tool for forecasting hours worked per project by each of several individuals per time period is disclosed. The tool comprises several project activity profiles each representing an hour distribution. The tool also comprises a data store containing data specific to projects including a level of effort budgeted for the project, identification of the type of the project, a start date of the project, and a delivery date of the project. The tool also comprises a data store containing data about each of the individuals including identification of the projects on which the individuals are authorized to work. The tool also comprises an allocator component that generates the forecast of hours to be worked by each individual for the projects for each of a series of time periods.

19 Claims, 3 Drawing Sheets

FORECASTING AND ANALYSIS TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer software, and more particularly, but not by way of limitation, to a forecasting and analysis tool.

BACKGROUND OF THE INVENTION

Organizations may desire to closely monitor and control consumption of personnel hours allocated to business projects. Inputs needed to plan the consumption of personnel hours may change materially and lead to frequent reworking of the plan of budgeted hours for business projects. Achieving the desired plan accuracy may lead managers or other planning entities to divert excessive time away from other activities to replanning activities.

SUMMARY OF THE INVENTION

A software tool for forecasting hours worked per project by each of several individuals per time period is disclosed. The tool comprises several project activity profiles each representing an hour distribution. The tool also comprises a data store containing data specific to projects including a level of effort budgeted for the project, identification of the type of the project, a start date of the project, and a delivery date of the project. The tool also comprises a data store containing data about each of the individuals including identification of the projects on which the individuals are authorized to work. The tool also comprises an allocator component that generates the forecast of hours to be worked by each individual for the projects for each of a series of time periods.

A method of forecasting the number of hours a plurality of individuals will work on one or more projects during a series of time periods is also disclosed. The method comprises defining several project activity profiles that identify a distribution of the consumption of project hours. The method also comprises defining project specific data including a personnel hour budget, a delivery date, and a project activity profile selected from the several project activity profiles. The method also comprises defining data about the individuals including the projects on which the individuals are authorized to work. The method also comprises determining the hours to be consumed for each project during each time period based on the project delivery date and the distribution of project hour consumption associated with each project by the project activity profile defined for the project and distributing a portion of the hours to be consumed for the project during each of the time periods to each individual that is authorized to work the project.

A method of forecasting staffing for project planning is disclosed. The method comprises inputting a total level of effort for the projects, inputting a project type for the projects; using the project type to identify a project profile, determining a number of personnel hours for each period of the projects based on the project profile, and allocating available personnel to the projects for each of the periods of the project.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Organizations may base important business decisions on their forecasts of project hours that personnel will work. The lack of appropriately skilled personnel to work on a project may lead to cancellation of or delay in working an otherwise desirable project. To assure that business decisions are based on the best information, these forecasts are desirably updated when new information changes the basis of the prior forecast. For example, unplanned personnel changes, additional project scope, and actual reported hours consumed over an earlier period of the project may change the basis of the prior forecast. Managers may replan frequently to accommodate such changes in the basis of forecasts, taking valuable time away from other management activities. According to one embodiment, the present tool provides a software tool which allocates demand among a set of available resources, reducing the time spent in replanning or reprojecting by managers.

Figure 1:
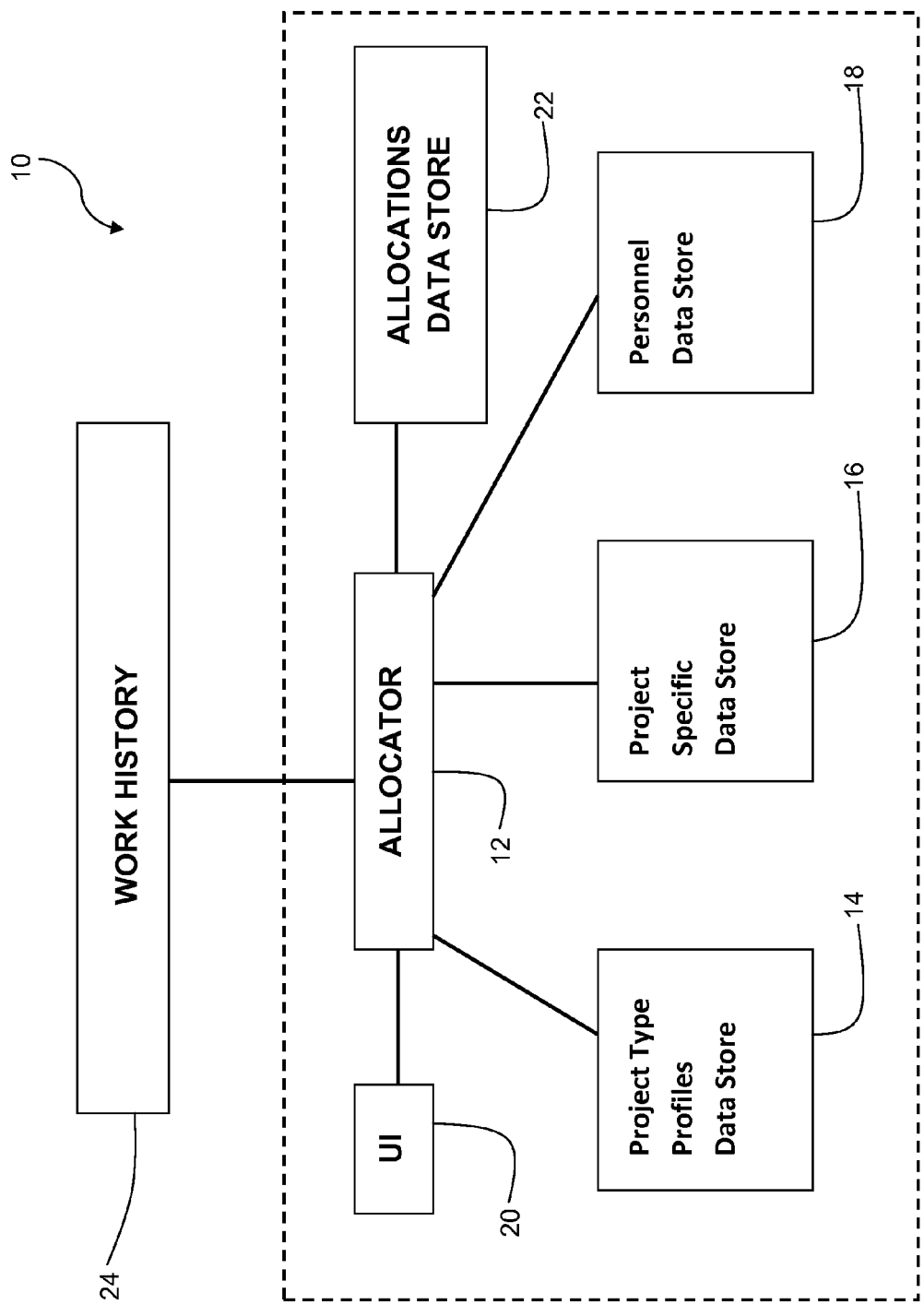
FIG. 1 is a block diagram of an embodiment of a forecasting system.

Turning now to FIG. 1, a block diagram of a forecasting system 10 is depicted. The forecasting system 10 comprises an allocator 12, a project type profiles data store 14, a project specific data store 16, a personnel data store 18, a user interface 20, and an allocations data store 22. The allocator 12 processes inputs from the user interface 20 and data contained in the project type profiles data store 14, the project specific data store 16, and the personnel data store 18. The allocator 12 uses this information to identify available personnel resources. The allocator 12 allocates the budgeted project hours among these personnel resources, which may be termed an allocation, and captures the allocation in the allocations data store 22. The allocation may also be referred to as a staffing plan. The allocation indicates how many hours each personnel resource is planned to work on each active project for a series of time periods. The allocation is an end product of the forecasting system 10. In an embodiment, the time periods may be week-long and/or month-long or other length periods. The forecasting system 10 may be implemented on a general purpose computer system. General purpose computer systems are discussed in more detail hereinafter.

Projects may tend to follow distinct lifecycles depending upon the type of project and the work activities involved. For example, a project that involves software changes may extend twenty-five weeks. A work group may be involved in both the software change activity and an associated testing activity. The distribution of hours consumed by a work group over the twenty-five weeks of a project may follow characteristic patterns. A gate peaking pattern may be characterized by hours increasing to a maximum at the completion of a deliverable followed by a sudden decrease. As for example, the hours may increase to a maximum at the milestone for software completion and hand-over to testing, dropping off after completion of the software completion milestone, and again increasing to a maximum at the milestone for testing completion. Other distributions including a bell shaped hour consumption distribution, a uniform distribution, and a linear ramp distribution are contemplated. In an embodiment, compositions of segments of two or more hour distributions may be provided.

The project type profiles data store 14 contains representations of several distributions of project hours, also referred to as a distribution or a lifecycle hour distribution, that may be associated with specific projects by the allocator 12 when determining the allocations. The distributions of project hours are patterns which support any project duration and any number of hours to be allocated. The allocator 12 may determine hour allocations based on the remaining level of effort for each of the projects spread across the available personnel resources based on the distribution of project hours selected for each project. For example, the lifecycle hour distribution may indicate that 6 percent of the available level of effort hours be expended in week 10, 8 percent of the available level of effort hours be expended in week 11, 8 percent of the available level of effort hours be expended in week 12, and 4 percent of the available level of effort hours be expended in week 13. The allocator 12 then may operate to generate a staffing plan which consumes project hours in the amount of 6 percent of available level of effort hours in week 10, 8 percent of available level of effort hours in week 11, 8 percent of available level of effort hours in week 12, and 4 percent of available level of effort hours in week 13.

In an embodiment, the forecasting system 10 communicates with a work history data store 24 containing data about hours worked by personnel as charged against specific projects. The work history data store 24 may be associated with or embodied in a personnel time reporting system or a time sheet program. The work history data may also be referred to as actuals. The allocator 12 in an embodiment may access the work history data store 24 to determine the remaining level of effort hours available on a project by subtracting hours reported as worked on the project from the initial project level of effort and then allocate the remaining level of effort hours over the remaining lifecycle of the project according to the selected lifecycle hour distribution. In an embodiment, the allocator 12 may analyze the actuals of completed projects to adjust the lifecycle hour distributions stored in the project type profiles data store 14. This may be referred to as recursively readjusting the lifecycle hour distributions. In some embodiments, however, the forecasting system 10 may not include or communicate with a work history data store 24.

In one embodiment the work history data store 24 may include historical actuals for some or all specific projects. In one embodiment, the system may determine that any differences between actuals and projections during previous periods should be considered for purposes of refinement and redistributions over remaining future project periods for the projects having such differences. In this embodiment it is not the profiles being modified using the historical data but the inputs to the profiles and hence the resulting distributions. For example, for a given project, where the actuals were lower in the prior month than the projections, the system may identify the difference between the actuals and the projections and redistribute the difference over future periods for that given project on some basis. Conversely, where the prior month's actuals were over the projections, an overage amount might be deducted from or over subsequent periods to account for the additional work already completed on the project. These refinements or redistributions may be made according to the distribution methods previously discussed.

The specific data associated with each project includes the end date or release date of the project and the level of effort budgeted to complete the project. The personnel hours budgeted to complete the project may be referred to as a level of effort (LOE). In an embodiment, a project start date may also be included in the project specific data.

The personnel data store 18 contains information about each of the personnel who may be tasked with working on the several projects. Personnel data may define the maximum and minimum hours per week the individual may work, identify the projects which the individual may work on, and define the individual's skill level for each project. In an embodiment, the individual's skill level may only identify whether the individual is or is not authorized to work on a given project. The personnel data may identify the employment status of the employee as a contractor, a full-time employee, a part-time employee, or other employment status. The personnel data may identify the preference levels of individuals for the projects. In an embodiment, the personnel data includes scheduled time off, for example vacations or maternity leave.

The user interface 20 is used to input the specific project data and the personnel data to initialize the forecasting system 10 and to update the specific project data and the personnel data as initial values change or as new projects are kicked off. In organizations, project data may change as projects are cancelled, project requirements are modified, delivery dates slip out or pull in, and other changes affect the project data. Personnel data may change as individuals take vacation, experience periods of illness, take maternity leave, terminate their employment with the organization, develop new project expertise, evolve their career goals and hence their project preferences, transition from full-time employees to contract employees, and make or experience other changes. As the personnel data changes, the staffing plan generated by the forecasting system 10 changes. The forecast and/or staffing plan may be automatically regenerated responsive to any such change, may be scheduled to regenerate intermittently, manually or otherwise. The regeneration may be set such that either the entire plan is regenerated or selected such that only portions of the plan are regenerated.

Figure 2:
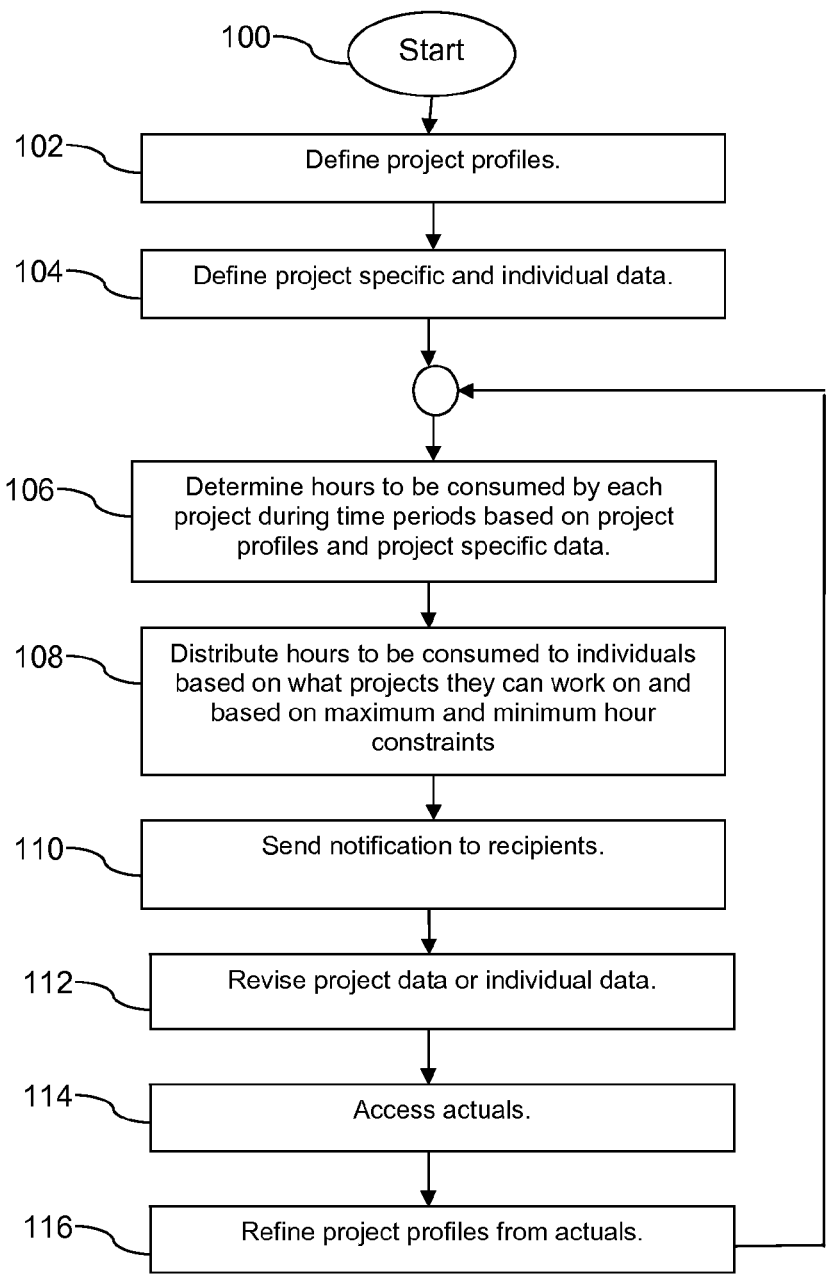
FIG. 2 is a flow diagram of a method according to an embodiment of the forecasting system.

In an embodiment, the forecasting system 10 is implemented using Microsoft Excel with the Solver add-in activated and with a What's Best! 7.0 solver add-in from Lindo Systems installed. The What's Best! 7.0 solver add-in is employed to overcome a limitation on the number of variables of the Microsoft Excel Solver add-in. The information associated with the project type profiles data store 14, the project specific data store 16, and personnel data store 18 in this embodiment are contained within a spreadsheet. In one embodiment, the present system may also use Visual Basic for Applications to provide portions of this implementation. Each time period of interest, for example each month, is set-up as a linear programming problem based on the hours each project should consume during the time period of interest, based on the constraints of what individuals can work on what projects, and based on the constraints of maximum and minimum number of hours the individuals may work. This linear programming problem is then solved by the solver and/or the What's Best! 7.0 add-in. Note that other embodiments may employ other spreadsheet tools and other solver add-ins and another macro-like programming language to provide glue logic Turning now to FIG. 2, a method for forecasting hours to be worked per individual per project over a series of time periods is depicted. The method begins in block 100 and proceeds to block 102 where a plurality of project activity profiles are defined. These project activity profiles identify a distribution of project hours with respect to time, which is readily scalable to any size of project. The project activity profiles may include a code project type associated with a code project profile, a support project type associated with a support project profile, a code and support project type associated with a code and support project profile, a first level maintenance project type associated with a first level maintenance project profile, and a second level maintenance project type associated with a second level maintenance project profile. Generally, a project which involves code development may consume hours proportionally to the distribution of project hours defined in the code project type. Similarly, other types of projects may consume hours proportionally to the distribution of project hours defined for those project types.

In an embodiment, additional project activity profiles may be defined which exhibit arbitrary distributions of hours. The additional project activity profiles may include a uniform hour distribution, a ramp hour distribution, a bell curve hour distribution, and one or more profiles composed of segments of other profiles. The uniform hour distribution conforms with constant consumption of project hours over the lifecycle of the project. The ramp hour distribution conforms with increasing consumption of project hours as the project progresses. The bell curve hour distribution conforms with increasing consumption of project hours in the early part of the project, a peaking consumption of project hours in the middle part of the project, and a decreasing consumption of project hours in the late part of the project.

The method proceeds to block 104 where project specific data and individual data is defined. The project specific data may include the hours budgeted for the project, the project activity profile associated with the project, the completion date for the project, and the start date for the project. Over the lifecycle of the project the hours budgeted for the project may change, for example if project scope is increased to include additional requirements and/or deliverables. The individual data may identify the projects that each individual may work on. In an embodiment, the individual data may include the minimum and maximum hours that it is desirable for an individual to work per work period, for example per month or per week. Different individuals may have different minimum and maximum hours.

The method proceeds to block 106 where the number of hours to be consumed by each active project per time period is determined based on the project activity profile associated with each project. The project activity profile is associated with a distribution of project hours with respect to time which may be scaled to the total budgeted hours of any project. For example, the distribution of project hours for a project may call for 6 percent of the available level of effort hours be expended in week 10, 8 percent of the available level of effort hours be expended in week 11, 8 percent of the available level of effort hours be expended in week 12, and 4 percent of the available level of effort hours be expended in week 13. If the total level of effort budgeted for the exemplary project is 1000 hours, then 60 hours in week 10, 80 hours in week 11, 80 hours in week 12, and 40 hours in week 13 would be identified to be consumed.

The method proceeds to block 108 where the hours to be consumed in each of the time periods are allocated to individuals. The method employs the techniques of linear programming to find an acceptable solution which takes into account multiple constraints, including what individuals are authorized to work on specific projects, the maximum number of hours the individuals are authorized to work, the minimum number of hours the individuals are authorized to work, and other constraints. A forecast may result from the processing of block 108. The forecast projects hours which may be worked for each individual for each project for each work period. The forecast may be used as a staffing plan that identifies the hours to be worked for each project for each work period.

The method proceeds to block 110 where the method optionally sends notification to recipients, for example managers with oversight responsibility for projects and/or for the individuals working the projects, that the staffing plan has been updated. This notification may further include an updated copy of the staffing plan, perhaps as an attachment to an email.

The method proceeds to block 112 where some of the project data and/or individual data are changed, for example by entering new information with the user interface 20. The entering of new information acts as a trigger to cause the staffing plan to be regenerated. While not shown, the staffing plan may also be regenerated on a periodic basis to support management activities, for example on a monthly basis, or when manually triggered by an operator using the user interface 20. However in some embodiments, some plan information may be excluded from the regeneration, such as hours actually used in the past month or previous periods. In this manner, the actual historical staffing information is unaffected by the regeneration. Further businesses may periodically be required to commit to certain planned hours for a future period, such as next month's staffing forecast. The automatic regeneration may exclude, for example, such committed plan hours.

Next, the actuals are accessed (block 114). The method proceeds to block 116 where the method optionally refines the project profiles based on the actuals of multiple projects. In an embodiment, the refinement of profiles resulting in refinement of project hour distributions is based only on actuals from completed projects. In another embodiment, actuals from both completed and in-progress projects may be employed to refine the profiles.

Figure 3:
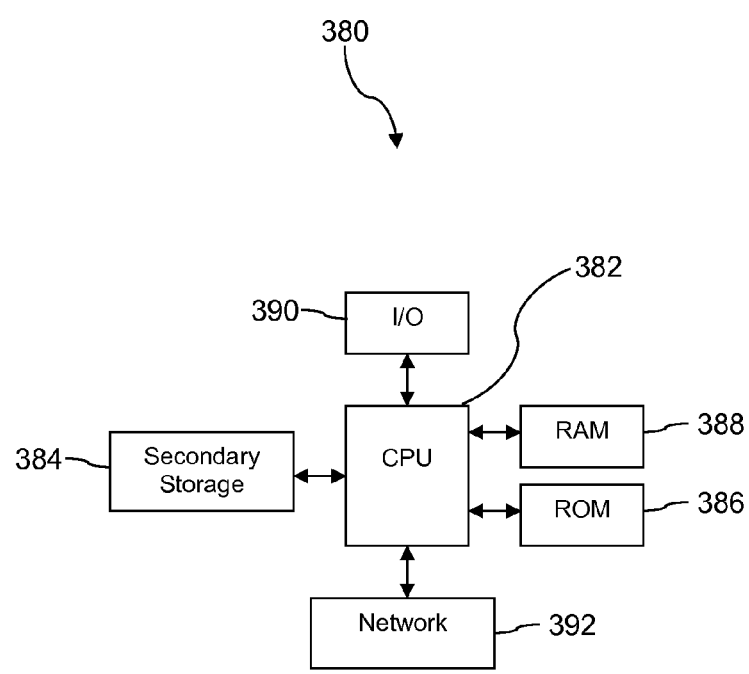
FIG. 3 illustrates an exemplary general purpose computer system suitable for implementing the several embodiments of the disclosure.

The forecasting system 10 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system comprising a processor, the system for forecasting hours worked per project for a plurality of individuals, the system further comprising:

a computer readable storage medium storing a plurality of project activity profiles, each project activity profile corresponding to a different project type and including a corresponding distribution of hours, wherein a first distribution of hours comprises a characteristic pattern of hours that includes a proportion of total hours to be expended for a first project type for each of a series of time periods established by actual hours consumed during at least one of one or more completed projects of the first project type and a completed portion of an in-progress project of the first project type;

a data store, comprising a computer readable storage medium, containing project data for a second project to be completed, the project data including available hours budgeted for the second project, identification of a type of the second project, a start date of the second project, and a delivery date of the second project, wherein the second project is identified as the first project type;

a data store, comprising a computer readable storage medium, containing data about a plurality of individuals including identification of projects on which each individual is authorized to work; and an allocator, stored on a computer readable storage medium, which when executed by a processor, generates a forecast of hours to be worked on the second project for each of the plurality of individuals authorized to work on the second project with respect to each of a series of time periods for the second project, wherein the forecast is generated based on the project data, the data about the plurality of individuals authorized to work on the second project, and the one of the plurality of project activity profiles corresponding to the first project type, wherein the allocator selects the first distribution of hours from the one of the plurality of activity profiles corresponding to the first project type to apply to the second project, and wherein the allocator determines hour allocations for each of the series of time periods for the second project by applying the available hours budgeted for the second project to the proportion of total hours to be expended for the project type for each of the series of time periods from the first distribution of hours.

2. The system of claim 1, wherein the plurality of project activity profiles include a code project profile, a support project profile, a combined code and support project profile, a first level maintenance project profile, and a second level maintenance project profile.

3. The system of claim 2, wherein the characteristic pattern is selected from the group consisting of: a gate distribution, at least one bell curve hour distribution, and a distribution composed of at least two of a composition of linear ramp, gate, and bell curve hour distribution segments.

4. The system of claim 1, further including a data store containing a plurality of project histories of hours worked and wherein the allocator, when executed, further uses the project histories of hours worked to generate the forecast.

5. The system of claim 4, wherein the allocator, when executed, further modifies the plurality of project activity profiles based on the project histories of hours worked.

6. The system of claim 1, wherein the allocator is provided using a computer program that invokes a spreadsheet program and an associated spread sheet solver.

7. The system of claim 1, wherein the forecast of hours to be worked on the second project for each of the plurality of individuals authorized to work on the second project is fed to a management tool which, when executed, summarizes the forecast of hours.

8. The system of claim 1, wherein the allocator, when executed, further generates the forecast of hours to be worked on the second project based on a generic maximum number of hours and a generic minimum number of hours an individual is permitted to work during any time period.

9. The system of claim 1, wherein the data store containing data about the plurality of individuals further includes data relating to a maximum and a minimum number of hours each individual is permitted to work during each of a series of time periods, and the allocator, when executed, further generates the forecast of hours to be worked per project based on the maximum and minimum number of hours the plurality of individuals are permitted to work during any time period of the series of time periods.

10. A computer implemented method of forecasting the number of hours a plurality of individuals will work on one or more projects during a series of time periods, comprising:
storing a plurality of project activity profiles on a computer readable storage medium, wherein each of the plurality of project activity profiles corresponds to a different project type and includes a corresponding distribution of hours, wherein a first distribution of hours comprises a characteristic pattern of hours that includes a proportion of total hours to be expended for a first project type for each of a series of time periods established by actual hours consumed during at least one of one or more completed projects of the first project type and a completed portion of an in-progress project of the first project type;
storing project data for a second project to be completed on a computer readable storage medium, wherein the project data includes available hours budgeted for the second project, identification of a project activity profile selected from the plurality of project activity profiles, a start date of the second project, and a delivery date of the second project, wherein the one of the plurality of activity profiles corresponding to the first distribution of hours is identified for the second project;
storing second data on a computer readable storage medium, wherein the second data relates to the plurality of individuals and includes identification of projects on which each individual is authorized to work; and
determining, with an allocator stored on a computer readable storage medium and executed by a processor, hours to be consumed for the second project during each of a series of time periods for the second project based on applying the available hours budgeted for the second project to the proportion of total hours to be expended for the first project type for each of the series of time periods from the first distribution of hours; and
distributing, with the allocator, for the second project, a portion of the hours to be consumed for the second project during each of the time periods for the second project to one or more individuals of the plurality of individuals that are authorized to work on the second project, wherein the distributing is based on the project data and the second data.

11. The computer implemented method of claim 10, wherein the distributing the portion of the hours to be consumed for the second project is based at least partially on keeping the hours to be consumed by the one or more individuals during each time period at or above a generic minimum number of hours per time period and no more than a generic maximum number of hours per time period.

12. The computer implemented method of claim 10, wherein the second data further includes an individual maximum number of hours a given individual should work and an individual minimum number of hours the given individual should work, and wherein the distributing a portion of the hours to be consumed for the second project is based at least partially on keeping the hours to be consumed by the one or more individuals during each time period no less than the individual minimum number of hours per time period and no more than the individual maximum number of hours per time period.

13. The computer implemented method of claim 10, further including:
accessing project work histories; and
revising, with the allocator, the distributions of project hour consumption based on the project work histories.

14. The computer implemented method of claim 10, further including:
modifying project specific data; and
automatically redetermining, with the allocator, the number of hours each of the one or more individuals will work on the second project during each of the time periods for the second project.

15. The computer implemented method of claim 14, further including sending notification of the redetermining of the number of hours each of the one or more individuals will work on the projects during each of the time periods for the second project to a configurable list of recipients.

16. The computer implemented method of claim 10, further including:
modifying the data of an individual; and
automatically redetermining, with the allocator, the number of hours each of the one or more individuals will work on the projects during each of the time periods for the second project.

17. The computer implemented method of claim 10, further including sending a report of the number of hours each of the one or more individuals will work on the second project during each of the time periods for the second project to an executive management system.

18. A computer implemented method of forecasting staffing for project planning, comprising:
inputting, using a processor, to a project type profiles data store comprising a computer readable storage medium, a total level of effort for a project, wherein the total level of effort comprises a total number of hours to be allocated for the project;

inputting, using a processor, to a project type profiles data store comprising a computer readable storage medium, a project type for the project;

inputting, using a processor, to a project profiles data store comprising a computer readable storage medium, a project profile associated with the project type, wherein the project profile comprises a distribution of hours comprising a characteristic pattern of hours that includes a proportion of total hours to be expended for the project type for each of a series of time periods established by actual hours consumed during at least one of one or more completed projects of the project type and a completed portion of an in-progress project of the project type;

using, by a processor, the project type to identify the project profile;

determining, by an allocator stored on a computer readable storage medium and executed by a processor, a number of personnel hours for each of a plurality of periods of the project by applying the total level of effort for the project to the proportion of total hours to be expended for the project type for each of the series of time periods from the distribution of hours, wherein the number of personnel hours for each of the plurality of periods is a proportional amount of the total number of hours allocated for the project as defined by the distribution of hours; and allocating, by executing the allocator, available personnel to the project for each of the plurality of periods of the project.

19. The system of claim 1, wherein the allocator, when further executed by a processor, recursively readjusts the forecast of hours.

* * * * *